(12) United States Patent
Arisaka et al.

(10) Patent No.: US 7,976,972 B2
(45) Date of Patent: Jul. 12, 2011

(54) METHOD OF PRESERVING POLYMER ELECTROLYTE FUEL CELL STACK AND PRESERVATION ASSEMBLY OF POLYMER ELECTROLYTE FUEL CELL STACK

(75) Inventors: Shinichi Arisaka, Osaka (JP); Yoichiro Tsuji, Osaka (JP); Eiichi Yasumoto, Kyoto (JP); Kazuhito Hatoh, Osaka (JP); Shinsuke Takeguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 886 days.

(21) Appl. No.: 11/629,496

(22) PCT Filed: Jun. 14, 2005

(86) PCT No.: PCT/JP2005/010826
§ 371 (c)(1),
(2), (4) Date: Dec. 14, 2006

(87) PCT Pub. No.: WO2005/122310
PCT Pub. Date: Dec. 22, 2005

(65) Prior Publication Data
US 2007/0243430 A1 Oct. 18, 2007

(30) Foreign Application Priority Data
Jun. 14, 2004 (JP) .................................. 2004-175047

(51) Int. Cl.
*H01M 6/00* (2006.01)
*H01M 8/00* (2006.01)
*H01M 10/00* (2006.01)
*H01M 8/06* (2006.01)
*H01M 8/04* (2006.01)

(52) U.S. Cl. ........................ 429/48; 429/408; 429/428
(58) Field of Classification Search .................. 429/12, 429/13, 30, 34, 35, 36, 37, 38, 39
See application file for complete search history.

(56) References Cited

U.S. PATENT DOCUMENTS
5,314,762 A 5/1994 Hamada et al.
(Continued)

FOREIGN PATENT DOCUMENTS
JP 3-208262 A 9/1991
(Continued)

*Primary Examiner* — Dah-Wei D Yuan
*Assistant Examiner* — Stephan Essex
(74) *Attorney, Agent, or Firm* — McDermott Will & Emery LLP

(57) ABSTRACT

Provided is a method of preserving a PEFC stack, which is capable of controlling degradation of performance of the PEFC stack during a time period that elapses from when the stack is placed in an uninstalled state until it is placed in an installation position and is practically used. Provided is a preservation assembly of the PEFC stack which is capable of sufficiently inhibiting degradation of performance of the PEFC stack particularly during a time period that elapses from when the stack is placed in the uninstalled state until it is placed in the installation position and is practically used. A method of preserving a PEFC stack that is provided with an oxidizing agent passage (30) having an inlet and an outlet and extending through a cathode and a reducing agent passage (40) having an inlet and an outlet and extending through an anode, comprising preserving the PEFC (200) stack in an uninstalled state in such a manner that an interior of the oxidizing agent passage (30) and an interior of the reducing agent passage (40) are set in a pressure-reduced state.

2 Claims, 9 Drawing Sheets

U.S. PATENT DOCUMENTS

| | | | |
|---|---|---|---|
| 6,040,838 A | 3/2000 | Webb et al. | |
| 6,114,058 A * | 9/2000 | Judkins et al. | 429/13 |
| 6,358,637 B1 * | 3/2002 | Fuss | 429/12 |
| 2001/0010252 A1 | 8/2001 | Hirata et al. | |
| 2003/0198842 A1 | 10/2003 | Nishida et al. | |

FOREIGN PATENT DOCUMENTS

| | | |
|---|---|---|
| JP | 5-190196 A | 7/1993 |
| JP | 5-258762 A | 10/1993 |
| JP | 6-251788 A | 9/1994 |
| JP | 7-272738 A | 10/1995 |
| JP | 8-45528 A | 2/1996 |
| JP | 8-124588 A | 5/1996 |
| JP | 9-180747 A | 7/1997 |
| JP | 9-213358 A | 8/1997 |
| JP | 9-223511 A | 8/1997 |
| JP | 10-50328 A | 2/1998 |
| JP | 10-507572 A | 7/1998 |
| JP | 2001-185179 A | 7/2001 |
| JP | 2002-93424 A | 3/2002 |
| JP | 2002-93448 A | 3/2002 |
| JP | 2003-317771 A | 11/2003 |
| JP | 2005-71949 A | 3/2005 |
| WO | WO 96/12317 | 4/1996 |

* cited by examiner

US 7,976,972 B2

METHOD OF PRESERVING POLYMER ELECTROLYTE FUEL CELL STACK AND PRESERVATION ASSEMBLY OF POLYMER ELECTROLYTE FUEL CELL STACK

RELATED APPLICATIONS

This application is the U.S. National Phase under 35 U.S.C. §371 of International Application No. PCT/JP2005/010826, filed on Jun. 14, 2005, which in turn claims the benefit of Japanese Application No. 2004-175047, filed on Jun. 14, 2004, the disclosures of which Applications are incorporated by reference herein.

FIELD OF THE INVENTION

The present invention relates to a method of preserving a polymer electrolyte fuel cell stack and a preservation assembly of the polymer electrolyte fuel cell stack. Particularly, the present invention relates to a method of preserving a polymer electrolyte fuel cell stack in an uninstalled state, and a preservation assembly of the polymer electrolyte fuel cell stack.

BACKGROUND ART

In the conventional method of stopping a polymer electrolyte fuel cell (hereinafter referred to as PEFC), supply of an oxidizing agent and a reducing agent is stopped and these materials remaining within the PEFC stack are purged by, for example, an inert gas such as nitrogen (see patent document 1). Thereafter, during a stopped state of the PEFC, an oxidizing agent passage and a reducing agent passage are typically filled with the inert gas or the like to inhibit entry of air into the PEFC stack (see patent document 2). Thereby, oxidization of an electrode catalyst layer within the PEFC stack and degradation of performance of the PEFC are inhibited. In addition, there has been disclosed a method of preserving the PEFC while maintaining a potential of a separator at a predetermined value during a power generation stopped state of the PEFC (see patent document 3).

When a membrane-electrode-assembly (MEA) is created, an electrode catalyst layer is formed by applying a coating material for formation of a catalyst layer onto a surface of a polymer electrolyte fuel cell membrane. The coating material for formation of the catalyst layer contains an alcoholic component as a solvent. As catalyst powder, for example, carbon powder carrying platinum-ruthenium alloy particles or platinum particles is used. The catalyst powder is mixed with an ethyl alcohol dispersion containing perfluorocarbonsulfonic acid polymers and produced into a paste. The paste is applied to a surface of the polymer electrolyte membrane to form the electrode catalyst layer. The solvent containing the alcohol component enters a part of a porous electrode catalyst layer and remains there after manufacturing the MEA.

As a method of improving a drawback that an ion resistance at an interface between the polymer electrolyte membrane and the electrode catalyst layer increases, and a drawback that an electron resistance at an interface between the electrode catalyst layer and a diffusion electrode layer increases because the electrode catalyst layer and the diffusion electrode layer are not firmly joined to each other, there has been disclosed a method of heating, pressurizing and integrating an element including a polymer electrolyte membrane sandwiched between two electrodes in a solvent (see e.g., patent document 4). Furthermore, there has been disclosed a method of heating and pressurizing a polymer electrolyte membrane and/or an electrode catalyst layer containing a solvent substantially without being immersed in the solvent (see e.g., patent document 5). In accordance with this method, because the solvent within a MEA vaporizes during a step of integration, swelling of the polymer electrolyte membrane that is due to the solvent is controlled, maintaining a desired joint state at the interface between the polymer electrolyte membrane and the catalyst layer.

[Patent Document 1] Japanese Laid-Open Patent Application Publication No. Hei. 6-251788
[Patent Document 2] Japanese Laid-Open Patent Application Publication No. Hei. 7-272738
[Patent Document 3] Japanese Laid-Open Patent Application Publication No. 5-258762.
[Patent Document 4] Japanese Laid-Open Patent Application Publication No. Hei. 3-208262
[Patent Document 5] Japanese Laid-Open Patent Application Publication No. 2002-93424

DISCLOSURE OF THE INVENTION

Problems to Be Solved by the Invention

As illustrated in the patent documents 1 through 3, it is known that an electrode catalyst layer is oxidized and thereby its performance degrades if it contacts an oxide such as air under the condition in which the electrode catalyst layer has reached a catalyst activation temperature after start of power generation.

However, inventors discovered that degradation of performance such as decrease of an output voltage, in particular, a noticeable increase in a voltage drop rate of the output voltage occurs if a long time period elapses before power generation starts after a PEFC stack is assembled. From studies conducted by the inventors, it has been found that an oxide of a solvent remaining on an electrode catalyst is a cause of the degradation of the performance.

Traditionally, little attention has been paid to the degradation of the performance before the start of the power generation of the PEFC among those skilled in the art. For this reason, the conventional stopping method of the PEFC addresses a condition after a service starts and is not intended to inhibit degradation of the electrode catalyst layer before the PEFC stack is incorporated into a PEFC system after manufactured. In other words, the conventional method of inhibiting degradation of performance of the PEFC is intended to inhibit degradation of performance of the PEFC. To be specific, since an inert gas or the like is supplied from an external peripheral device through pipes or the like connected to the oxidizing agent passage and the reducing agent passage of the PEFC stack, the conventional method is not applicable to the PEFC stack before incorporated into the PEFC system, in particular, in a single piece state during storage or transportation.

The present invention has been developed to solve the above described problems, and an object of the present invention is to provide a method of preserving a polymer electrolyte fuel cell stack, which is capable of controlling degradation of performance of the polymer electrolyte fuel cell stack during a time period that elapses from when the stack is placed in an uninstalled state until it is placed in an installation position and is practically used. Another object of the present invention is to provide a preservation assembly of the polymer electrolyte fuel cell stack which is capable of sufficiently inhibiting degradation of performance of the polymer electrolyte fuel cell stack particularly during a time period that elapses from when the stack is placed in the uninstalled state until it is placed in the installation position and is practically used.

Means for Solving the Problems

After intensive studies conducted by the inventors to achieve the above described objects, they presumed that degradation of performance of the PEFC stack in the uninstalled state is caused by the fact that, in the electrode catalyst layer of the MEA, a remaining solvent such as alcohol reacts with oxygen to generate an oxide such as acetic acid which poisons the catalyst, and alternation of the electrode catalyst layer progresses due to the poisoning that lasts for a long period, causing degradation of performance of the electrode catalyst. According to the documents 4 and 5, volatilization of the solvent can control swelling of the polymer electrolyte membrane in manufacture of the MEA. However, according to the inventors' studies, this was not substantially effective in controlling degradation of performance of the PEFC stack in the uninstalled state. It was presumed that, since the solvent existing inside the porous electrode catalyst layer remained there without vaporization.

The inventors conceived the present invention based on the above presumption, and examined the effects. As a result, the effects were verified.

To achieve the above mentioned objective, according to a first invention, a method of preserving a polymer electrolyte fuel cell stack of a first invention that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage, comprises: preserving the polymer electrolyte fuel cell stack in an uninstalled state in such a manner that an interior of the oxidizing agent passage and an interior of the reducing agent passage are set in a pressure-reduced state. In such a configuration, since a solvent remaining in the oxidizing agent side electrode catalyst layer and in the reducing agent side electrode catalyst layer is volatilized in the pressure-reduced state, in particular, it is possible to sufficiently control degradation of performance of the polymer electrolyte fuel cell stack during a time period that elapses from when the stack is placed in an uninstalled state until it is placed in an installation position and is practically used. In addition, under the pressure-reduced state, oxygen concentration remaining in the interior of the oxidizing agent passage and in the reducing agent passage can be easily kept less than oxygen concentration in atmosphere, and the partial oxidization reaction and dehydration and condensation reaction of the organic solvent component remaining in the electrode catalyst layer (including a reaction between organic solvent components, a reaction between partial oxidization products, and a reaction between the organic solvent component and the partial oxidation product) are sufficiently inhibited. According to this respect, in particular, it is possible to sufficiently control degradation of performance of the polymer electrolyte fuel cell stack during a time period that elapses from when the stack is placed in an uninstalled state until it is placed in an installation position and is practically used.

As used herein, the term "uninstalled state" refers to a state before an assembled polymer electrolyte fuel cell stack is incorporated into a fuel cell system. More specifically, the uninstalled state may include a state before an oxidizing agent supply device is coupled to the oxidizing agent passage of the polymer electrolyte fuel cell stack or a state before a reducing agent supply device is coupled to the reducing agent passage, for example, a state in which the polymer electrolyte fuel cell stack is being preserved or transported. Furthermore, the polymer electrolyte fuel cell stack in the uninstalled state may include a polymer electrolyte fuel cell stack which is being manufactured according to the preservation method of the present invention. For example, in a manufacturing method in which the MEA is stacked and is preserved in a temporarily fastened state, and the polymer electrolyte fuel cell stack is finally assembled with current collecting plates, end plates, etc, disposed at both ends thereof, when or just before the polymer electrolyte fuel cell stack is incorporated into the polymer electrolyte fuel cell system, this temporarily fastened state substantially corresponds to the uninstalled state of the polymer electrolyte fuel cell stack.

In order to surely obtain the effects of the present invention, according to a second invention, in the preservation method of the polymer electrolyte fuel cell stack, the pressure-reduced state may be such that a vacuum degree is in a range of not less than $10^{-5}$ Pa and not more than $10^{-1}$ Pa.

According to a third invention, the method of preserving the polymer electrolyte fuel cell stack may comprise: a volatilizing and removing step in which the interior of the oxidizing agent passage and the interior of the reducing agent passage of the polymer electrolyte fuel cell stack in the uninstalled state are set in the pressure-reduced state; and a maintaining step for maintaining the pressure-reduced state. In such a configuration, in the volatilizing and removing step, volatilization of the solvent remaining in the oxidizing agent electrode catalyst layer and in the reducing agent side electrode catalyst layer is promoted, and the volatilized solvent is removed outside the polymer electrolyte fuel cell stack. In the maintaining step, the volatilized state of the solvent is maintained. As a result, it is possible to control degradation of performance of the polymer electrolyte fuel cell stack in the uninstalled state.

According to a fourth invention, in the method of preserving the polymer electrolyte fuel cell stack, in the volatilizing and removing step, the polymer electrolyte fuel cell stack may be accommodated into a sealing container provided with an exhaust outlet, and an exhaust device may be connected to the exhaust outlet to exhaust air from an interior of the sealing container; and in the maintaining step, the exhaust device may be attached in a sealed state to the exhaust outlet, or a sealing valve disposed to open and close the exhaust outlet may be closed. In particular, if the exhaust device is attached to the exhaust outlet of the sealing container in the maintaining step, it operates intermittently to enable the oxidizing agent passage and the reducing agent passage to continue the pressure-reduced state for a long time period. As a result, it is possible to control degradation of performance of the polymer electrolyte fuel cell stack for a long time period.

In order to surely obtain the effects of the present invention, according to a fifth invention, in the volatilizing and removing step, exhaust devices may be attached in a sealed state to one of the inlet and the outlet of the oxidizing agent passage and one of the inlet and the outlet of the reducing agent passage, and sealing plugs or sealing valves may be attached in a sealed state to the other of the inlet and the outlet of the oxidizing agent passage and the other of the inlet and the outlet of the reducing agent passage to allow the exhaust devices to exhaust air from the interior of the oxidizing agent passage and from the interior of the reducing agent passage; and in the maintaining step, the exhaust devices, the sealing plugs, and the sealing valves are attached in a sealed state or closed.

According to a sixth invention, the method of preserving the polymer electrolyte fuel cell stack may comprise a power generation step for causing the polymer electrolyte fuel cell stack to generate power. By causing the polymer electrolyte fuel cell stack to generate power, the solvent or unwanted substances such as metal remaining in the interior of the polymer electrolyte fuel cell stack can be removed along with the water generated through the electrochemical reaction. As a result, it is possible to further control degradation of performance of the polymer electrolyte fuel cell stack.

In order to surely obtain the effects of the present invention, according to a seventh invention, in the method of preserving the polymer electrolyte fuel cell stack, a current density in the power generation step may be not less than $0.1$ A/cm$^2$ and not more than $0.4$ A/cm$^2$ per area of a catalyst layer.

In order to surely obtain the effects of the present invention, according to an eighth invention, in the method of preserving the polymer electrolyte fuel cell stack, a power generation continuation time in the power generation step may be three hours or more.

In order to surely obtain the effects of the present invention, according to a ninth invention, in the method of preserving the polymer electrolyte fuel cell stack, a power generation continuation time in the power generation step may be a time period that elapses until a voltage variation becomes 2 mV/h or less.

In order to surely obtain the effects of the present invention, according to a tenth invention, in the method of preserving the polymer electrolyte fuel cell stack, the power generation step may be performed within 300 hours after the polymer electrolyte fuel cell stack is manufactured.

According to an eleventh invention, a preservation assembly of a polymer electrolyte fuel cell stack comprise: a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage; and a maintaining unit that maintains a pressure-reduced state in the oxidizing agent passage and the reducing agent passage, wherein the maintaining unit includes a sealing container that accommodates the polymer electrolyte fuel cell stack and is provided with an exhaust outlet, an exhaust device attached in a sealed state to the exhaust outlet, a sealing plug that seals the exhaust outlet, or a sealing valve openably disposed to close the exhaust outlet in a sealed state. In such a configuration, since a solvent remaining in the oxidizing agent side electrode catalyst layer and in the reducing agent side electrode catalyst layer is volatilized, in particular, it is possible to sufficiently control degradation of performance of the polymer electrolyte fuel cell stack during a time period that elapses from when the stack is placed in an uninstalled state until it is placed in an installation position and is practically used. In addition, under the pressure-reduced state, oxygen concentration in the interior of the oxidizing agent passage and in the reducing agent passage can be easily kept less than oxygen concentration remaining in atmosphere, and the partial oxidization reaction and dehydration and condensation reaction of the organic solvent component remaining in the electrode catalyst layer (including a reaction between organic solvent components, a reaction between partial oxidization products, and a reaction between the organic solvent component and the partial oxidation product) are sufficiently inhibited. According to this respect, in particular, it is possible to sufficiently control degradation of performance of the polymer electrolyte fuel cell stack during a time period that elapses from when the stack is placed in an uninstalled state until it is placed in an installation position and is practically used. In particular, the exhaust device of the maintaining unit operates intermittently to enable the oxidizing agent passage and the reducing agent passage to continue the pressure-reduced state for a long time period. As a result, it is possible to control degradation of performance of the polymer electrolyte fuel cell stack for a long time period.

In order to surely obtain the effects of the present invention, according to a twelfth invention, in the preservation assembly of the polymer electrolyte fuel cell stack, the pressure-reduced state may be such that a vacuum degree is in a range of not less than $10^{-5}$ Pa and not more than $10^{-1}$ Pa.

In order to surely obtain the effects of the present invention, according to a thirteenth invention, in the preservation assembly of the polymer electrolyte fuel cell stack, the polymer electrolyte fuel cell stack is a polymer electrolyte fuel cell stack that has been caused to perform a power generation process. In such a configuration, since the solvent or unwanted substances such as metal remaining in the interior of the polymer electrolyte fuel cell stack can be removed along with the water generated through the electrochemical reaction, it is possible to further control degradation of performance of the polymer electrolyte fuel cell stack. As used herein, the term "power generation process" refers to a process for causing the polymer electrolyte fuel cell stack to generate power.

In order to surely obtain the effects of the present invention, according to a fourteenth invention, a preservation assembly of a polymer electrolyte fuel cell stack comprises: a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage; and a maintaining unit that maintains a pressure-reduced state of the oxidizing agent passage and the reducing agent passage, wherein the maintaining unit may include an exhaust device attached in a sealed state to one of an inlet and an outlet of the oxidizing agent passage, a sealing plug or a sealing valve attached in a sealed state to the other of the inlet and the outlet of the oxidizing agent passage, an exhaust device attached in a sealed state to one of an inlet and an outlet of the reducing agent passage, and a sealing plug or a sealing valve attached in a sealed state to the other of the inlet and the outlet of the reducing agent passage. In such a configuration, since a solvent remaining in the oxidizing agent side electrode catalyst layer and in the reducing agent side electrode catalyst layer is volatilized in the pressure-reduced state, in particular, it is possible to sufficiently control degradation of performance of the polymer electrolyte fuel cell stack during a time period that elapses from when the stack is placed in an uninstalled state until it is placed in an installation position and is practically used. In addition, under the pressure-reduced state, oxygen concentration remaining in the interior of the oxidizing agent passage and in the reducing agent passage can be easily kept less than oxygen concentration in atmosphere, and the partial oxidization reaction and dehydration and condensation reaction of the organic solvent component in the electrode catalyst layer (including a reaction between organic solvent components, a reaction between partial oxidization products, and a reaction between the organic solvent component and the partial oxidization product) are sufficiently inhibited. According to this respect, in particular, it is possible to sufficiently control degradation of performance of the polymer electrolyte fuel cell stack during a time period that elapses from when the stack is placed in an uninstalled state until it is placed in an installation position and is practically used. In particular, the exhaust device of the maintaining united operates intermittently to enable the oxidizing agent passage and the reducing agent passage to continue the pressure-reduced state for a long time period. As a result, it is possible to control degradation of performance of the polymer electrolyte fuel cell stack for a long time period.

Effects of the Invention

As should be appreciated from the above, in accordance with the present invention, it is possible to provide a method of preserving a polymer electrolyte fuel cell stack, which is capable of controlling degradation of performance of the polymer electrolyte fuel cell stack during a time period that elapses from when the stack is placed in an uninstalled state until it is placed in an installation position and is practically used. Also, in accordance with the present invention, it is possible to provide a preservation assembly of the polymer electrolyte fuel cell stack which is capable of sufficiently inhibiting degradation of performance of the polymer electrolyte fuel cell stack particularly during a time period that elapses from when the stack is placed in the uninstalled state until it is placed in the installation position and is practically used.

Figure 1:
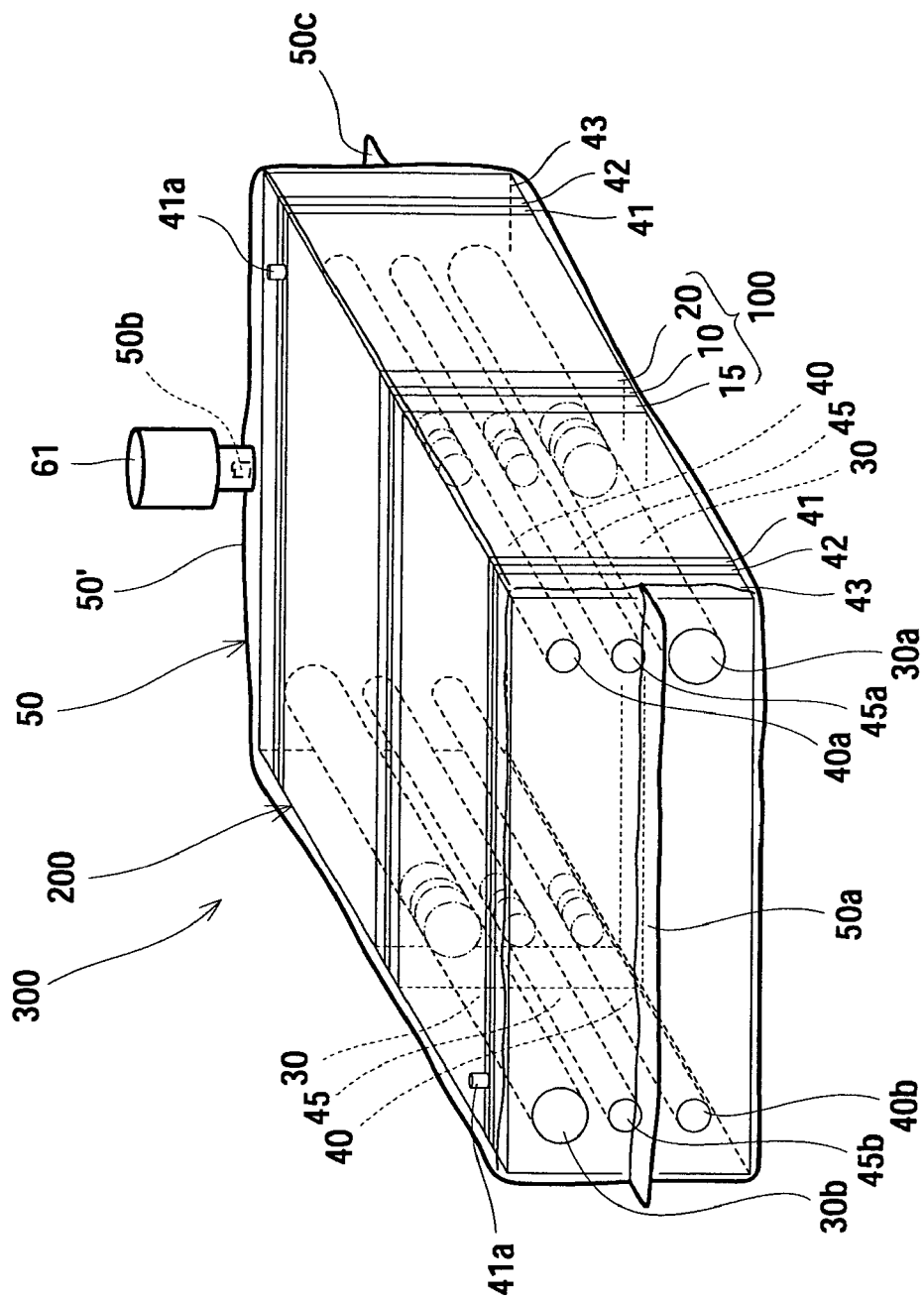
FIG. 1 is a schematic view of a preservation assembly of a PEFC stack according to a first embodiment of the present invention.

| Explanation of reference numerals | |
|---|---|
| 1 | polymer electrolyte membrane |
| 2 | oxidizing agent side electrode catalyst layer |
| 3 | reducing agent side electrode catalyst layer |
| 4 | oxidizing agent side diffusion electrode layer |
| 5 | reducing agent side diffusion electrode layer |
| 10 | MEA |
| 15 | cathode separator |
| 20 | anode separator |
| 30 | oxidizing agent passage |
| 30a | oxidizing agent passage inlet |
| 30b | oxidizing agent passage outlet |
| 40 | reducing agent passage |
| 40a | reducing agent passage inlet |
| 40b | reducing agent passage outlet |
| 41 | current collecting plate |
| 42 | insulating plate |
| 43 | end plate |
| 45 | coolant passage |
| 45a | coolant passage inlet |
| 45b | coolant passage outlet |
| 50 | sealing container |
| 50' | tubular body |
| 50a | opening (lug portion) |
| 50b | exhaust port |
| 50c | lug portion |
| 61 | exhaust device |
| 70 | sealing plugs |
| 80 | squeezed packings |
| 100 | cell |
| 200 | PEFC stack |
| 300, 310, 320 | preservation assembly of PEFC stack |
| S0, S1, S2 | steps |
| V | average cell voltage |
| H | operation time |

BEST MODE FOR CARRYING OUT THE INVENTION

Hereinafter, best mode for carrying out the invention will be described with reference to the drawings. The above effects, other effects, features and advantages of the invention will more fully be apparent from the detailed description of preferred embodiments with reference to accompanying drawings.

Embodiment 1

Figure 2:
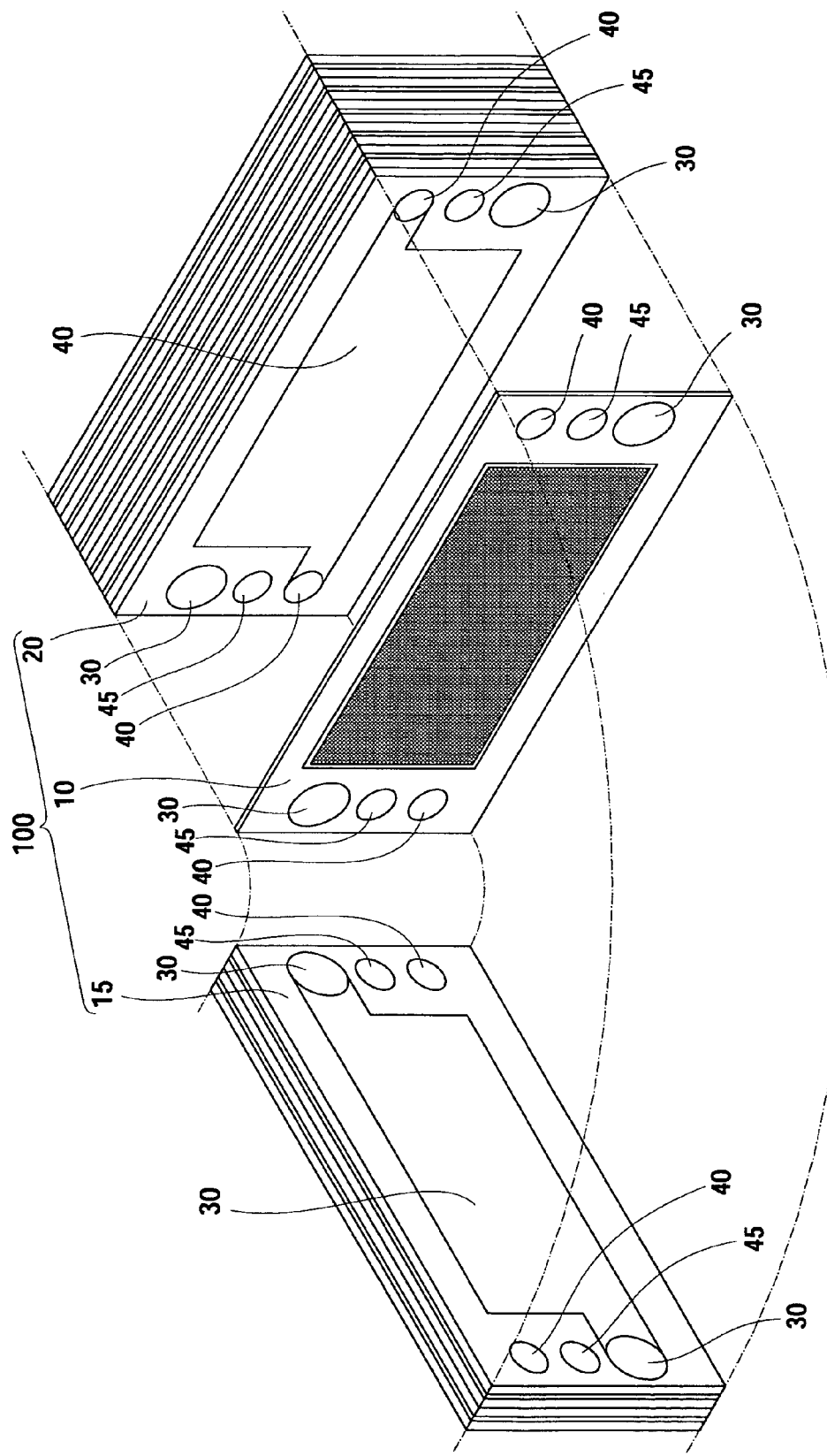
FIG. 2 is an exploded perspective view showing a structure of the PEFC stack included in the preservation assembly of the PEFC stack according to the first embodiment of the present invention.

A method of preserving a PEFC stack according to a first embodiment of the present invention will be described.
FIG. 1 is a schematic view of a preservation assembly of a PEFC stack according to the first embodiment of the present invention. FIG. 2 is an exploded perspective view showing a structure of the PEFC stack included in the preservation assembly according to the first embodiment of the present invention.

A PEFC stack 200 included in a preservation assembly 300 of the first embodiment is formed by stacking unit cells 100 that generate power through an electrochemical reaction. As shown in FIG. 2, the unit cell 100 includes a MEA 100, a cathode separator 15, and an anode separator 20, which are constructed of rectangular plates having substantially the same flat faces. The MEA 10 is sandwiched between the cathode separator 15 and the anode separator 20 such that one surface thereof is in contact with the cathode separator 15 and the other surface thereof is in contact with the anode separator 20. Each end portion of the cell 100 in the direction in which the cells 100 are stacked is in contact with an end plate 43 with a current collecting plate 41 and an insulating plate 42 interposed between the end portion and the end plate 43. The end plates 43 are fastened from opposite sides by fastener bolts (not shown). The PEFC stack 200 is employed in PEFC systems such as home cogeneration systems, two-wheeled automobiles, electric automobiles, hybrid electric automobiles, electric household appliances, and portable electric equipment such as portable computers, cellular phones, portable acoustic instruments, and handheld terminals.

Electric terminals 41a of the current collecting plates 41 are connected to an external load such as electric equipment. Through the electric terminals 41a, electric power is output. The PEFC stack 200 is provided with an oxidizing agent passage 30 and a reducing agent passage 40.

The oxidizing agent passage 30 is configured in such a manner that an oxidizing agent is supplied from an oxidizing agent passage inlet 30a and is divided to flow in the respective cells 100, and thereafter, the oxidizing agent gathers and is exhausted outside the PEFC stack 200 from an oxidizing agent passage outlet 30b. Typically, the oxidizing agent passage 30 is configured not to cross other passages, and is closed by sealing the oxidizing agent passage inlet 30a and the oxidizing agent passage outlet 30b. The reducing agent passage 40 is configured in the same manner. In this embodiment, as the oxidizing agent, oxygen or air is used. As the reducing agent, hydrogen or a material containing hydrogen is used.

In the first embodiment, the oxidizing agent passage inlet 30a and the reducing agent passage inlet 40a are formed at one end plate 43 of the PEFC stack 200. The reducing agent passage 40 is configured in the same manner.

The PEFC stack 200 is also provided with a coolant passage 45 through which a coolant such as water flows, in order to adjust the temperature of the PEFC stack 200. The coolant passage 45 is provided separately from the oxidizing agent passage 30 and the reducing agent passage 40. The coolant passage 45 is configured in such a manner that the coolant is supplied into the inside of the PEFC stack 200 from a coolant passage inlet 45a and is divided to flow between the respective of the stacked cells 100, and thereafter, the coolant is discharged outside the PEFC stack 200 from a coolant passage outlet 45b.

The cell 100 includes the MEA 10, the cathode separator 15, and the anode separator 20, which are stacked. As shown in FIG. 2, the oxidizing agent passage 30 is formed between the MEA 10 and the cathode separator 15 and the reducing agent passage 40 is formed between the MEA 10 and the anode separator 20.

Figure 3:
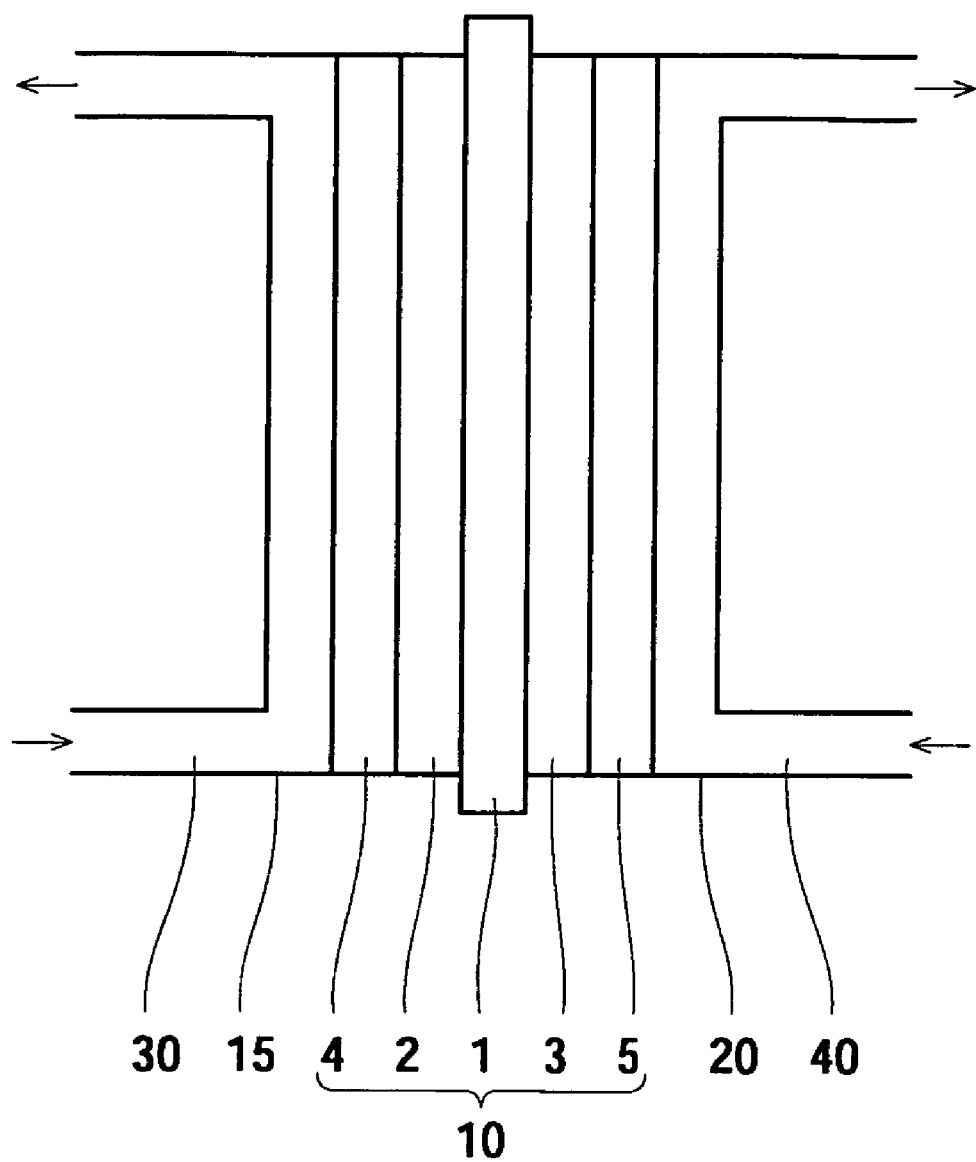
FIG. 3 is a schematic view showing a basic structure of a cell.

FIG. 3 is a schematic view showing a basic structure of the MEA.

The MEA 10 includes a polymer electrolyte membrane 1 comprised of an ion exchange membrane which selectively permeates hydrogen ions, a pair of electrode catalyst layers (oxidizing agent side electrode catalyst layer 2 and reducing agent side electrode catalyst layer 3) which are provided to sandwich the polymer electrolyte membrane 1 and are mainly comprised of carbon powder carrying platinum group metal catalyst thereon, and a pair of diffusion electrode layers (oxidizing agent side diffusion electrode layer 4 and reducing agent side diffusion electrode layer 5) provided on outer surfaces of the pair of electrode catalyst layers 2 and 3. The diffusion electrode layers 4 and 5 are configured to have gas-permeability and electron conductivity, for example, a porous structure.

The oxidizing agent side electrode catalyst layer 2, the oxidizing agent side diffusion electrode layer 4, and the cathode separator 15 form a cathode.

The reducing agent side electrode catalyst layer 3, the reducing agent side diffusion electrode layer 5 and the anode separator 20 form an anode.

Subsequently, an operation of the PEFC stack 200 constructed as described above will be described. The oxidizing agent is divided to flow the respective cells 100 through the oxidizing agent passage 30. In the respective cells 100, the oxidizing agent is supplied to the cathode. Here, the oxidizing agent side diffusion electrode layer 4 is exposed to the oxidizing agent. Likewise, the hydrogen, or the reducing agent containing the hydrogen is supplied to the anode. Here, the reducing agent side diffusion electrode layer 5 is exposed to the hydrogen or the reducing agent containing the hydrogen flowing through the reducing agent passage 40.

The oxidizing agent permeates the oxidizing agent side diffusion layer 4 and reaches the oxidizing agent side electrode catalyst layer 2. Likewise, the reducing agent permeates the reducing agent side diffusion electrode layer 5 and reaches the reducing agent side electrode catalyst layer 3.

When an electric circuit between the oxidizing agent side electrode catalyst layer 2 and the reducing agent side electrode catalyst layer 3 is established through the cathode separator 15, the anode separator 20, the current collecting plates 41 (see FIG. 1) and an external electric circuit (not shown), hydrogen is ionized in the reducing agent side electrode catalyst layer 3.

The hydrogen ion permeates the polymer electrolyte membrane 1 and is bonded to the oxygen ion in the oxidizing agent side electrode catalyst layer 2 to generate water. The ionization of hydrogen causes an electron to be generated in the reducing agent side electrode catalyst layer 3. The electron travels to the external electric circuit (not shown) through the reducing agent side diffusion electrode layer 5, and generates electric power.

As should be appreciated from the above operation, the oxidizing agent side electrode catalyst layer 2 and the reducing agent side electrode catalyst layer 3 are exposed to the agents filled in the oxidizing agent passage 30 and the reducing agent passage 40, respectively. Therefore, in the fuel cell just after manufacture, the oxidizing agent side electrode catalyst layer 2 and the reducing agent side electrode catalyst layer 3 are exposed to the air filled in the oxidizing agent passage 30 and the reducing agent passage 40. Upon exposure to the air, a solvent remaining in the oxidizing agent side electrode catalyst layer 2 and the reducing agent side electrode catalyst layer 3 is oxidized, causing the catalysts in the oxidizing agent side electrode catalyst layer 2 and the reducing agent side electrode catalyst layer 3 to be poisoned.

Accordingly, the preservation assembly 300 of the PEFC stack 200 of the first embodiment of the present invention is constructed as follows.

The preservation assembly 300 of the PEFC stack includes the PEFC stack 200 and a sealing container 50 that maintains the oxidizing agent passage 30 and the reducing agent passage 40 in a pressure-reduced state.

The sealing container 50 is formed of a bag or a box that is able to withstand a high vacuum state and is provided with an exhaust outlet 50b. An exhaust device 61 is connected to the exhaust outlet 50b in a sealed state.

The sealing container 50 is formed of a bag made of, for example, nylon or resin such as polyethylene, or a metal box. In this embodiment, the sealing container 50 is formed of the polyethylene bag of a multiple structure.

The sealing container 50 and the exhaust device 61 form a maintaining unit. Because the exhaust device 61 of the maintaining unit operates intermittently to enable the oxidizing agent passage 30 and the reducing agent passage 40 to continue their pressure-reduced states, it is possible to control degradation of performance of the PEFC stack 200 for a long time period.

The exhaust outlet 50b may be provided with a one-way valve (not shown) to maintain the pressure-reduced state in the interior of the sealing container 50 without inflow of a gas from outside. The one-way valve is able to control deterioration of the pressure-reduced state in the interior of the sealing container 50 even if the exhaust device 61 comes off or is attached in an unsealed state.

The PEFC stack 200 is a PEFC stack in an uninstalled state. The term "uninstalled state" refers to a state before an assembled PEFC stack is incorporated into a fuel cell system. Specifically, the uninstalled state refers to a state before an oxidizing agent supply device is coupled to the oxidizing agent passage of the PEFC stack or the reducing agent supply device is coupled to the reducing agent passage of the PEFC stack, for example, a state in which the PEFC stack is being preserved or transported. It shall be appreciated that the PEFC stack in the uninstalled state may include the PEFC stack that has gone through a short-time electrochemical reaction after manufactured. For example, the PEFC stack in the uninstalled state may also include a PEFC stack after performance check test, and a PEFC stack after a predetermined power generation process. Furthermore, the PEFC stack in the uninstalled state may include a PEFC stack which is being manufactured according to the preservation method of the present invention. For example, in a manufacturing method in which the MEA is stacked and is preserved in a temporarily fastened state, and the PEFC stack is finally assembled with the current collecting plates, the end plates, etc disposed at both ends thereof, when or just before incorporated into the PEFC system, this temporarily fastened state substantially corresponds to the uninstalled state of the PEFC stack.

Subsequently, a preservation method of the PEFC stack of the first embodiment will be described.

Figure 4:
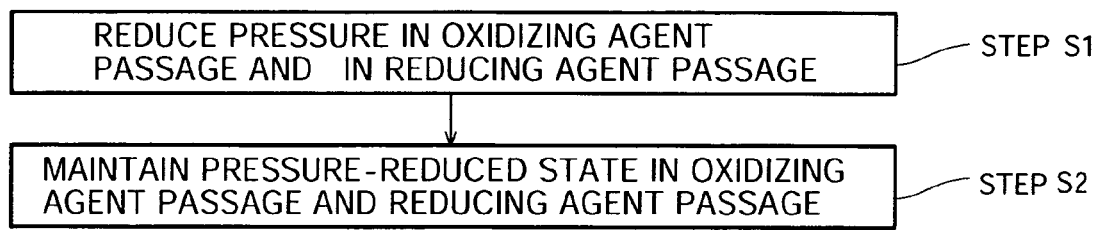
FIG. 4 is a flowchart showing a preservation method of the PEFC stack according to the first embodiment of the present invention.

FIG. 4 is a flowchart showing the preservation method of the PEFC stack of the first embodiment.

First, in step (volatilizing and removing step) S1, the pressure in the oxidizing agent passage 30 and the pressure in the reducing agent passage 20 of the PEFC stack 200 in the uninstalled state are reduced to set the oxidizing agent passage 30 and the reducing agent passage 40 to be in the pressure-reduced state. In this embodiment, as shown in FIG. 1, an exhaust device 61 is attached to the exhaust outlet 50b in the sealed state, and serves to exhaust air from the interior of the sealing container 50, i.e., the oxidizing agent passage 30 and the reducing agent passage 40 to thereby reduce the pressures.

The pressures are reduced to a vacuum degree in a range of $10^{-5}$ Pa to $10^{-1}$ Pa. In order to reduce the pressures, for example, G-100D manufactured by ULVAC. Inc. may be used as the exhaust device 61. The vacuum degree is desirably set higher, because vaporization of a solvent such as alcohol is promoted. Nonetheless, the vacuum degree is desirably set to $10^{-5}$ Pa or lower, because an internal structure of the PEFC stack 200 is likely to be damaged if the vacuum degree becomes too high.

The sealing container 50 having the multiple structure made of polyethylene is completed as follows. One end of a tubular body 50' formed of a polyethylene film of a multiple structure is welded to be closed to form a lug portion 50, and an opposite end is opened to form an opening 50a. A resin tubular body with a smaller diameter is fixed to an outer peripheral surface of the tubular body 50' to communicate with an interior of the tubular body 50' to form the exhaust outlet 50b. The PEFC stack 200 is accommodated into the interior of the container 50 through the opening 50a and the opening 50a is welded and closed so as to form the lug portion 50a.

Then, in step (maintaining step) S2, the exhaust device 61 attached to the exhaust outlet 50b is operated intermittently. This makes it possible to continue the pressure-reduced state in the oxidizing agent passage 30 and the reducing agent passage 40 for a long time period. As a result, it is possible to control degradation of performance of the PEFC stack 200 for a long time period.

The exhaust device 61 may be replaced in step S1 and in step S2. To be specific, in step S1, a relatively large-sized vacuum pump (e.g., G-100D manufactured by ULVAC. Inc.) is coupled as the exhaust device 61 to the exhaust outlet 50b through a pipe. In step S2, the pipe is removed from the exhaust outlet 50 and a small-sized vacuum pump (e.g., GHD-030 manufactured by ULVAC. Inc) is attached to the exhaust outlet 50b in a sealed state. The exhaust device 61 can be replaced while maintaining the pressure-reduced state in the interior of the sealing container 50 by a switching operation of a three-way valve provided in the exhaust outlet 50b. To be specific, the pipe for performing step S1 is connected to a first port of the three-way valve, the exhaust device for performing the step S2 is attached to a second port of the three-way valve, and the sealing container 50 is connected to a third port of the three-way valve. In step S1, switching is performed so that the third port is connected to the first port. In step S2, switching is performed so that the third port is connected to the second port. Because the large-sized exhaust device can be used in step S1, time required in step S1 can be decreased.

Hereinafter, the first embodiment of the present invention will be described based on examples, but the present invention is not intended to be limited to the examples below.

Example 1-1

The preservation assembly 300 of the PEFC stack of the example 1-1 was created as follows. In the PEFC stack 200, 50 of cells 100 were stacked and the cathode separators 15 and the anode separators 20 were each constructed of an isotropic graphite plate having a thickness of 3 mm. A plurality of manifold holes were formed at peripheral regions of main surfaces of the cathode separator 15 and the anode separator 20, and these manifold holes were coupled to form the oxidizing agent passage 30, the reducing agent passage 40, and the coolant passage 45 when the cells 100 are stacked.

The MEA 10 included in the cell 100 was manufactured as follows. The oxidizing agent side electrode catalyst layer 2 was formed by catalyst powder comprised of acetylene black based carbon powder (Denka Black FX-35 produced by Denki Kagaku Co. Ltd) carrying 25 wt % platinum particles with an average particle diameter of about 30 angstrom thereon. The reducing agent side electrode catalyst layer 3 was formed by catalyst powder comprised of acetylene black based carbon powder (Denka Black FX-35 produced by Denki Kagaku Co. Ltd) carrying 25 wt % platinum-ruthenium alloy particles (Pt:Ru=1:1 in weight ratio) with an average particle diameter of about 30 angstrom thereon. These catalyst powders were dispersed in isopropanol and were mixed with an ethyl alcohol dispersion (Flemion FSS-1 produced by Asahi Glass Co. Ltd) of perfluorocarbonsulfonic acid powder and the resulting mixture was produced into pastes. These pastes were applied to one main surfaces of carbon unwoven clothes (TGP-H-090 manufactured by TORAY Co., LTD) having a thickness of 250 μm by screen printing, thereby forming the oxidizing agent side electrode catalyst layer 2 and the reducing agent side electrode catalyst layer 3. The electrode catalyst layers 2 and 3 contain catalyst metal of 0.3 mg/cm² and perfluorocarbonsulfonic acid of 1.2 mg/cm².

As the polymer electrolyte membrane 1, a perfluorocarbonsulfonic acid membrane (Nafion 112 manufactured by U.S. Dupont Co. Ltd) with a thickness of 50 μm was used.

The oxidizing agent side electrode catalyst layer 2 and the reducing agent side electrode catalyst layer 3 were joined to main surfaces of both sides of the center section of the polymer electrolyte membrane 1 by hot pressing. Fluorine rubber sheets having a thickness of 250 μm were cut out to form a pair of gaskets. The gaskets sandwiched the polymer electrolyte membrane 1 so that the oxidizing agent side electrode catalyst layer 2 and the reducing agent side electrode catalyst layer 3 were exposed, and were joined to the polymer electrolyte membrane 1 by hot pressing (condition of 135° C., 1 Mpa, and 10 minutes).

As the exhaust device 61, the G-100D manufactured by ULVAC. Inc. was used in step S1 and the smaller vacuum pump GHD-030 manufactured by ULVAC. Inc was used in step S2.

As the sealing container 50, the polyethylene bag of the multiple structure was used.

In step S1, the inlet 30a and the outlet 30b of the oxidizing agent passage 30, and the inlet 40a and the outlet 40b of the reducing agent passage 40 were sealed by the sealing plugs 70 and the exhaust device 61. The exhaust device 61 reduced the vacuum degrees in the interior of the oxidizing agent passage 30 and in the interior of the reducing agent passage 40 to $10^{-3}$ Pa.

In step 2, the exhaust device 61 was operated intermittently, and the preservation assembly 300 of the PEFC stack was preserved at a temperature of 25° C. for 5000 h while maintaining the interior of the oxidizing agent passage 30 and the reducing agent passage 40 with the vacuum degrees of $10^{-2}$ Pa.

After preservation, the PEFC stack 200 was kept at 70° C. The reducing agent (80% hydrogen/20% carbon dioxide/10 ppm carbon monoxide) humidified to have a dew point of 65° C. was temperature-increased up to 65° C. and was supplied to the reducing agent passage 40. The air humidified to have a dew point of 70° C. was temperature-increased up to 70° C. and was supplied to the oxidizing agent passage 30. Under this condition, a rated power operation of the PEFC stack 200 was carried out.

The rated power operation of the PEFC stack 200 was carried out under the condition in which a fuel utilization ratio was 80%, an oxygen utilization ratio was 40%, and a current density was 0.3 A/cm².

Example 1-2

The preservation assembly 300 of the PEFC stack was created as in the example 1-1, and step S1 was performed. In step S2, the preservation assembly 300 was preserved as in the example at a temperature of 60° C. rather than 25° C.

The rated power operation was carried out under the same condition as that of the example 1-1.

[Comparison 1-1]

In a comparison 1-1, the PEFC stack 200 which is identical to that in the example 1-1 was preserved without step S1 and step S2, i.e., without exhausting the air from the oxidizing agent passage 30 and from the reducing agent passage 40. Then, as in the example 1-1, the PEFC stack 200 was preserved at a temperature of 25° C. for 5000 h.

The rated power operation was carried out under the same condition as that of the example 1-1.

[Comparison 1-2]

In a comparison 1-2, the PEFC stack 200 which is identical to that in the example 1-1 was preserved without step S1 and step S2, i.e., without exhausting the air from the oxidizing agent passage 30 and from the reducing agent passage 40. Then, as in the example 1-2, the PEFC stack 200 was preserved at a temperature of 60° C. for 5000 h. And, the rated power operation was carried out under the same condition as that of the example 1-1.

Figure 5:
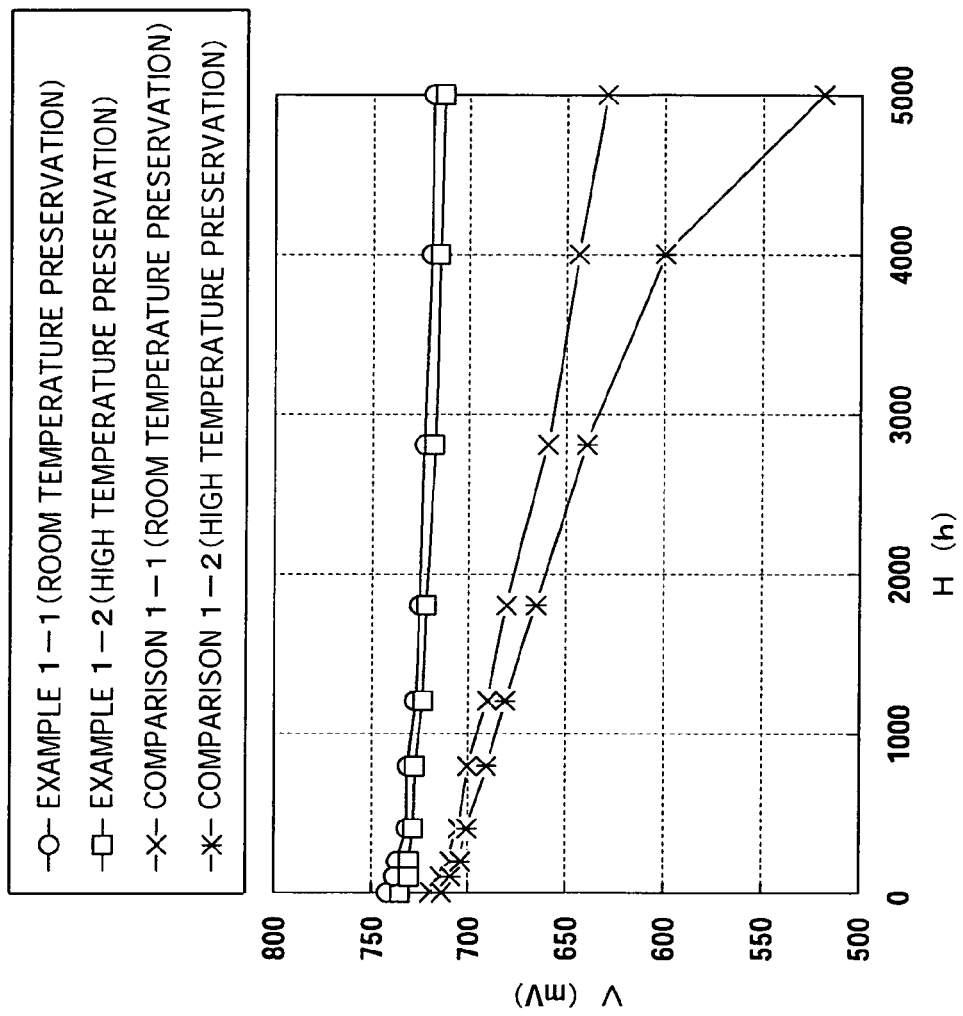
FIG. 5 is a view showing time-lapse variations in average cell voltages of PEFC stacks of examples 1-1 to 1-4 in a rated power operation.

FIG. 5 is a view showing time-lapse variations in average cell voltages of the PEFC stacks 200 of the example 1-1, the example 1-2, the comparison 1-1, and the comparison 1-2 in the rated power operation.

As shown in FIG. 5, a difference in an average cell voltage V between the example 1-1 and the example 1-2 was small, and decrease in the average cell voltages V of the example 1-1 and the example 1-2 was small. The average cell voltages V of the comparison 1-1 and the comparison 1-2 were lower than those of the example 1-1 and the example 1-2 from an initial stage of the rated power operation. With progress of the rated power operation, the average cell voltages V of the comparison 1-1 and the comparison 1-2 decreased more greatly than those of the example 1-1 and the example 1-2.

Alternative Example 1

Figure 6:
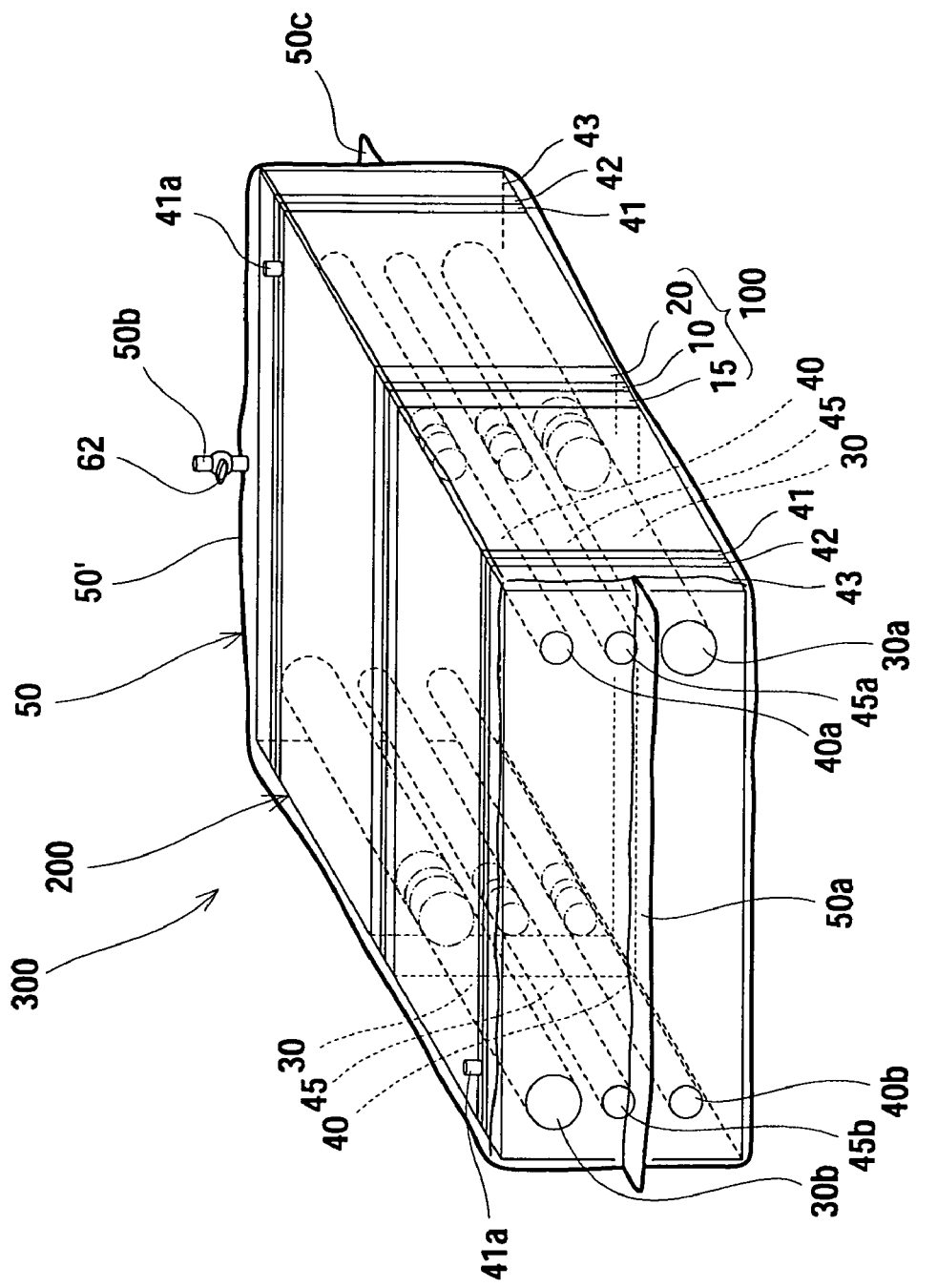
FIG. 6 is a schematic view of a preservation assembly of a PEFC stack according to an alternative example 1 according to the first embodiment of the present invention.

FIG. 6 is a view schematically showing the preservation assembly of the PEFC stack according to the first embodiment of the present invention.

In this alternative example, instead of the exhaust device 61, a sealing valve 62 is attached to the exhaust outlet 50b of the sealing container 50 to close the exhaust outlet 50b in a sealed state.

The sealing valve 62 and the sealing container 50 form the maintaining unit. The sealing valve is desirably hand-operated because a drive force is unnecessary during preservation, or otherwise may be an electrically-powered valve of a so-called normal closed type which is closed when the drive force is not applied.

In the volatilizing and removing step S1, the exhaust device 61 or the pipe connected to the exhaust device 61 is connected to the exhaust outlet 50b, and the exhaust device 61 exhausts the air from the interior of the sealing container 50, i.e., from the oxidizing agent passage 30 and the reducing agent passage 40 to reduce the pressures, under the condition in which the sealing valve 62 is opened.

In the maintaining step S2, the sealing valve 62 is closed, and the exhaust device 61 or the pipe connected to the exhaust device 61 is removed from the exhaust outlet 50b.

In this construction, since the maintaining unit is integral with the sealing container 50, management and disposal of the sealing members become unnecessary.

Embodiment 2

Figure 7:
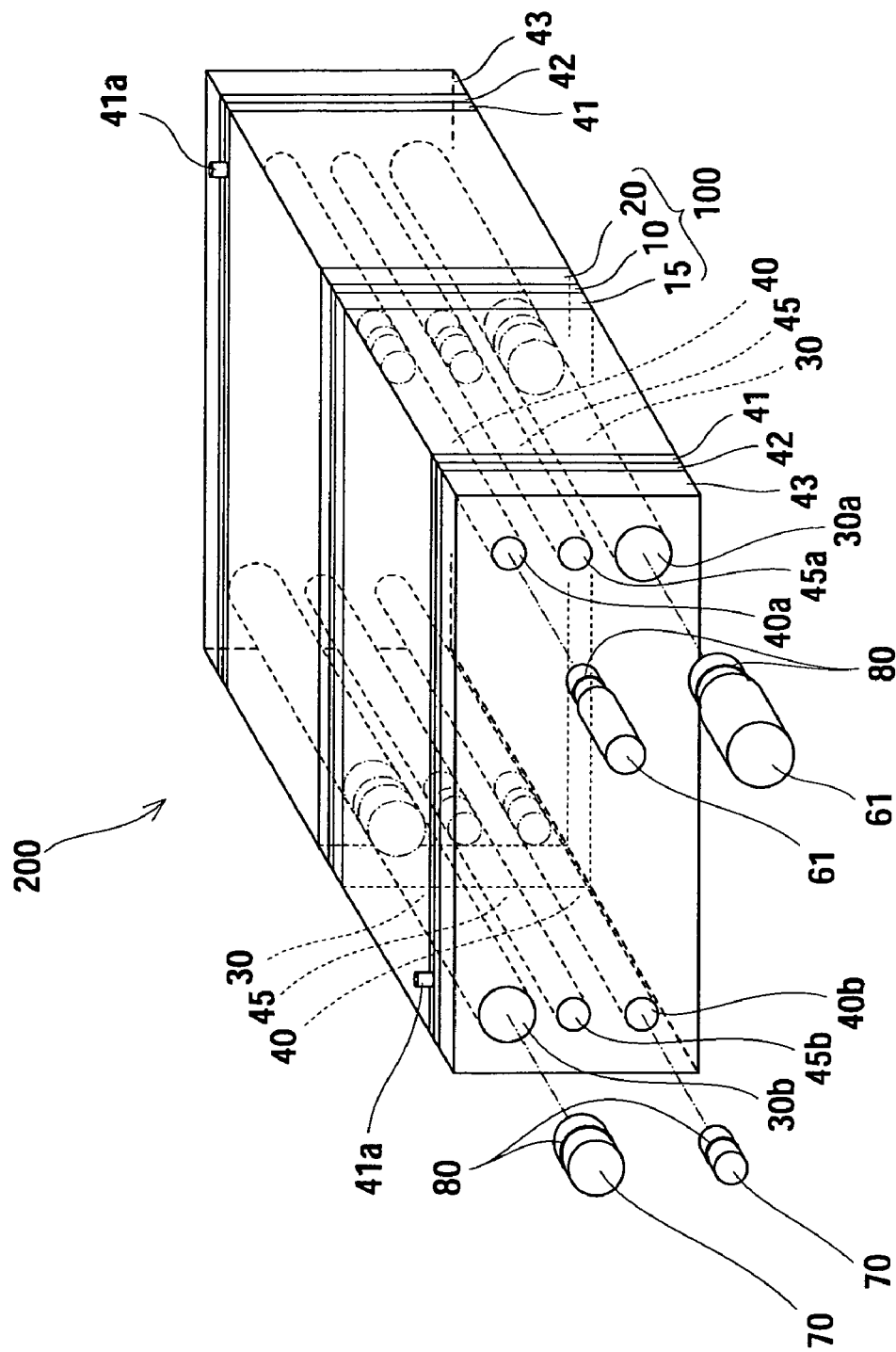
FIG. 7 is a schematic view of a preservation assembly of a PEFC stack according to a second embodiment of the present invention.

FIG. 7 is a view schematically showing a preservation assembly of a PEFC stack according to a second embodiment of the present invention. In FIG. 7, the same reference numerals as those of FIG. 1 denote the same or corresponding parts, and will not be further described.

As shown in FIG. 7, in the second embodiment of the present invention, the exhaust devices 61 are attached to the inlet 30a of the oxidizing agent passage 30 and the inlet 40a of the reducing agent passage 40 or the outlet 30b of the oxidizing agent passage 30 and the outlet 40b of the reducing agent passage 40, and the sealing plugs 70 are attached to the remaining. That is, in a preservation assembly 310 of the PEFC stack of this embodiment, the sealing plugs 70 and the exhaust devices 61 form the maintaining unit.

In this embodiment, the exhaust devices 61 are attached to the oxidizing agent passage inlet 30a and the reducing agent passage inlet 40a in a sealed state. As the exhaust devices 61, vacuum pumps identical to those of the first embodiment are used.

In this embodiment, the sealing plugs 70 are attached to the oxidizing agent passage outlet 30b and the reducing agent passage outlet 40b in a sealed state. In this embodiment, as shown in FIG. 7, squeezed packings 80 such as O-rings are attached to connecting portions of the exhaust devices 61 and the sealing plugs 70 to seal gaps between the connecting portions of the exhaust devices 61 and the oxidizing agent passage inlet 30a and the reducing agent passage inlet 40a and between the sealing plugs 70 and the oxidizing agent passage outlet 30b and the reducing agent passage outlet 40b.

In the preservation method of the PEFC stack 200 of this embodiment, as shown in FIG. 4, in step S1, the oxidizing agent passage outlet 30b and the reducing agent passage outlet 40b of the PEFC stack 200 are sealed by the sealing plugs 70, and the oxidizing agent passage inlet 30a and the reducing agent passage inlet 40a are sealed by the exhaust devices 61 in a sealed state. The exhaust devices 61 reduce the pressures in the oxidizing agent passage 30 and in the reducing agent passage 40.

In step S2, the exhaust device 61 is operated intermittently. This enables the oxidizing agent passage 30 and the reducing agent passage 40 to continue the pressure-reduced states for a long time period. As a result, it is possible to control degradation of performance of the PEFC stack 200 for a long time period.

As should be appreciated from the foregoing, in accordance with the present invention, it is possible to control degradation of performance of the polymer electrolyte fuel cell stack in the uninstalled state as in the first embodiment.

As in the first embodiment, in step S2, the small-sized exhaust device may be used as the exhaust device 61. This makes it easy to transfer the preservation assembly 310 of the PEFC stack with the exhaust device 61 attached thereto.

Whereas a pair of exhaust devices 61 are attached in a sealed state to the oxidizing agent passage 30a and the reducing agent passage 40a as shown in FIG. 7, two-forked pipes extending from suction ports of the exhaust devices 61 may alternatively be connected in a sealed state to the oxidizing agent passage outlet 30b and the reducing agent passage outlet 40b. This enable the use of the large-sized exhaust device in step S1, and as a result, time required for step S1 can be reduced.

Furthermore, in step S2, the exhaust devices 61 may be replaced by the sealing plugs. That is, the maintaining unit is comprised of four sealing plugs attached to the inlets 30a and 40a and the outlets 30b and 40b of the oxidizing agent passage 30 and the reducing agent passage 40. This makes the maintaining unit integral with the PEFC stack 200. As a result, management and disposal of the sealing members become unnecessary.

Alternative Example 2

Although not shown, the PEFC stack 200 may be provided with sealing valves attached to the inlets 30a and 40a and the outlets 30b and 40b of the oxidizing agent passage and the reducing agent passage, instead of the sealing plugs 70 as in the alternative example 1 of the first embodiment. Thereby, the sealing plugs 70 may be omitted, and the sealing valves may be used as separating valves of the PEFC stack 200 after the PEFC stack 200 is incorporated into the PEFC system.

In step S2, after closing the sealing valves, the exhaust devices 61 may be removed. Thereby, the maintaining unit is only the sealing valves. This makes the maintaining unit integral with the PEFC stack 200. As a result, management and disposal of members such as the sealing plugs become unnecessary.

Hereinafter, a second embodiment of the present invention will be described based on the examples, but the present invention is not limited to the examples below.

Example 2-1

The preservation assembly 310 of the PEFC stack of the example 2-1 was created as described below and preserved. The PEFC stack 200 which is identical to that of the example 1-1 was used.

As the exhaust device 61, the G-100D manufactured by ULVAC. Inc. was used in step S1 and the smaller vacuum pump GHD-030 manufactured by ULVAC. Inc was used in step S2.

As the sealing container 50, the polyethylene bag of the multiple structure was used.

In step S1, the inlets 30a and 40a and the outlets 30b and 40b of the oxidizing agent passage 30 and the reducing agent passage 40 were sealed by sealing plugs 70 and the exhaust device 61. The exhaust devices 61 reduced the vacuum degrees in the interior of the oxidizing agent passage 30 and in the interior of the reducing agent passage 40 to $10^{-2}$ Pa.

In step 2, the exhaust devices 61 were operated intermittently, and the preservation assembly 300 of the PEFC stack was preserved at a temperature of 25° C. for 5000 h while maintaining the interior of the oxidizing agent passage 30 and the interior of the reducing agent passage 40 with the vacuum degrees of $10^{-2}$ Pa.

After preservation, the rated power operation of the PEFC stack 200 was carried out under the conditions identical to those of the example 1-1.

Example 2-2

In the example 2-2, the PEFC stack 200 of the preservation assembly 310 of the PEFC stack, the exhaust devices 61, and the sealing container 50 which are identical to those of the example 2-1 were used.

In step S1, the pressure was reduced as in the example 2-1.

In step S2, the exhaust devices 61 were replaced by the sealing plugs 70, and the PEFC stack 200 was preserved as in the example 2-1. That is, the maintaining unit includes four sealing plugs 70, and the inlets 30a and 40a and the outlets 30b and 40b of the oxidizing agent passage and the reducing agent passage were sealed by the sealing plugs 70 and preserved.

After preservation, the rated power operation of the PEFC stack 200 was carried out under the conditions identical to those of the example 1-1.

The vacuum degrees in the interior of the oxidizing agent passage 30 and in the interior of the reducing agent passage 40 at the start of step S2 were $10^{-2}$ Pa, but decreased to $10^4$ Pa at the end of a preservation period.

Figure 8:
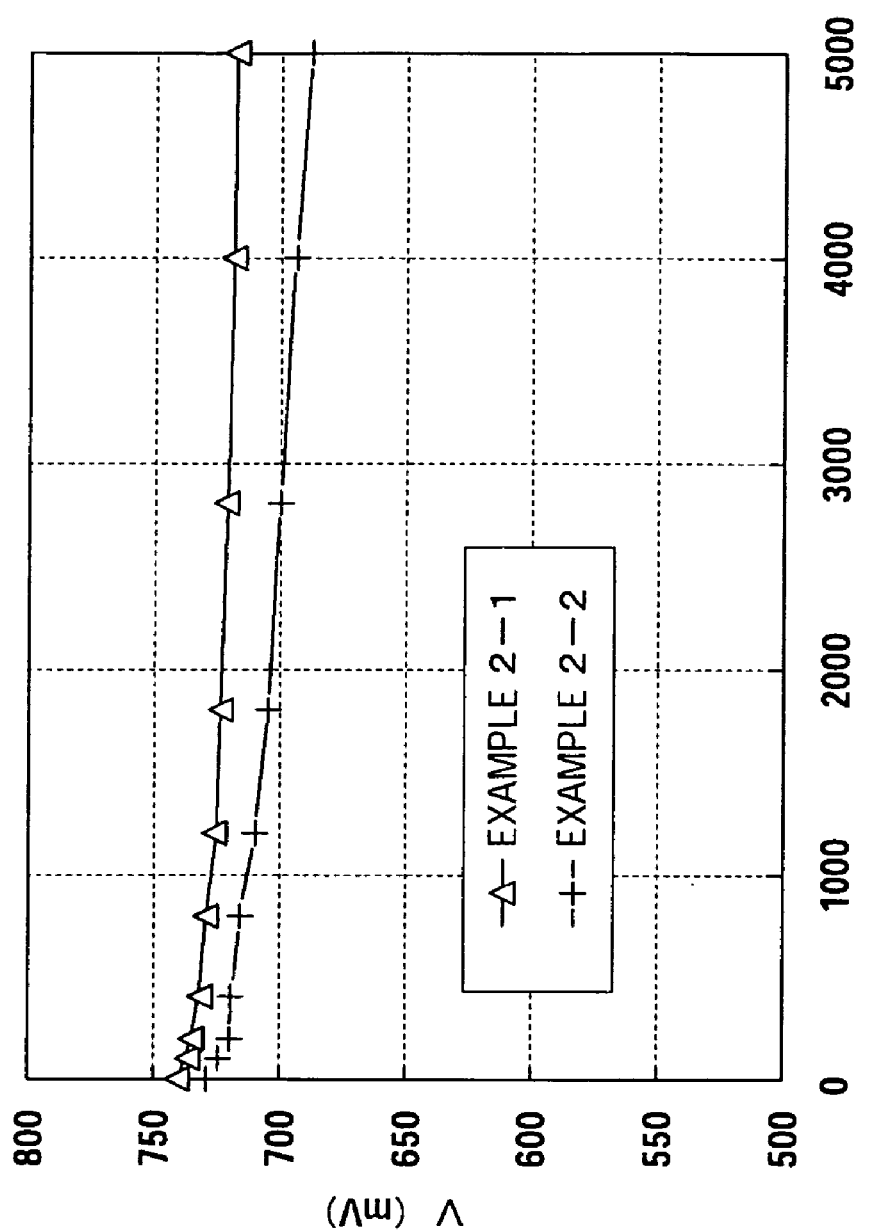
FIG. 8 is a view showing time-lapse variations in average cell voltages of PEFC stacks of examples 2-1 and 2-2 in a rated power operation.

FIG. 8 is a view showing time-lapse variations in average cell voltages of PEFC stacks 200 of examples 2-1 and 2-2 in the rated power operation.

As shown in FIG. 8, in the example 2-2, decrease in the average cell voltage V is controlled. In the example 2-1, decrease in the average cell voltage V is further controlled.

Embodiment 3

In a third embodiment of the present invention, after the PEFC stack 200 is caused to perform a power generation process, steps S1 and S2 are performed as in the first and second embodiments. That is, the construction of the preservation assembly 320 of the PEFC stack of this embodiment is identical to those of the first to sixth embodiments. Accordingly, the construction of the preservation assembly 320 of the PEFC stack of this embodiment will not further described but a preservation method of the PEFC stack of this embodiment will be described.

Figure 9:
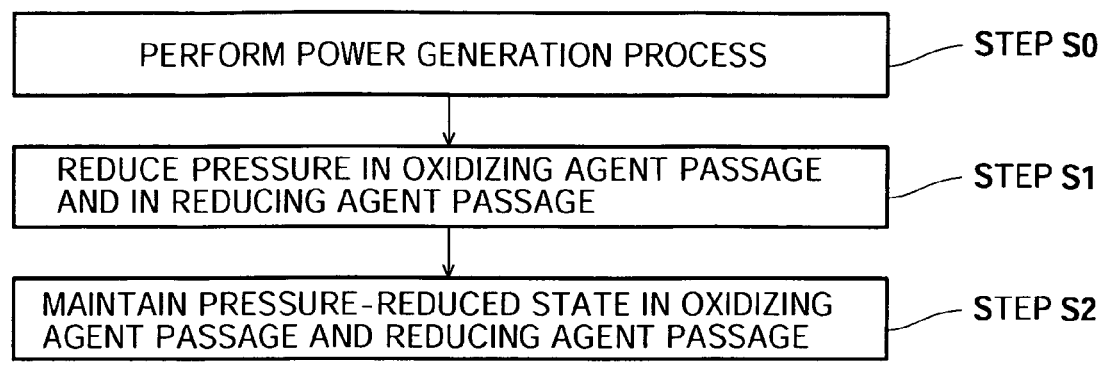
FIG. 9 is a flowchart showing a preservation method of a PEFC stack according to a third embodiment of the present invention.

FIG. 9 is a flowchart showing the preservation method of the PEFC stack of the third embodiment of the present invention. As shown in FIG. 7, in the preservation method of the PEFC stack of this embodiment, in step (power generation step) S0, the PEFC stack 200 in the uninstalled state is caused to generate power for a predetermined power generation continuation time with a predetermined current density. Then, the steps S1 and S2 are performed as in the first embodiment or the second embodiment.

In step S0, specifically, the PEFC stack 200 is maintained at an operating temperature, a power load is electrically connected between the current collecting plates 41, and a reducing material and an oxidizing material are supplied to the anode and the cathode, respectively, thereby causing a electrochemical reaction to occur in the PEFC stack 200. The electrochemical reaction is caused to continue for a predetermined power generation continuation time T with a predetermined current density I.

With the preservation method of the PEFC stack 200 of this embodiment, a solvent or unwanted substances such as metal remaining in the interior of the PEFC stack such as catalyst pores of the MEA can be discharged together outside the PEFC stack 200 with water generated through the electrochemical reaction in the power generation process, it is possible to surely control degradation of performance of the PEFC stack 200.

The current density I in the power generation process is suitably not less than 0.1 A/cm$^2$ and not more than 0.4 A/cm$^2$ per area of the catalyst layers 2 and 3 of the MEA 10. With such a current density, the water is generated uniformly through the electrochemical reaction in the MEA 10.

The power generation continuation time period T in the power generation process is suitably at least 3 hours so that the solvent and the unwanted substances are discharged outside the PEFC stack 200 along with the generated water.

The power generation continuation time period T in the power generation process is suitably set to a time period that elapses until a voltage variation (dV/dt) per cell at the end of the power generation process is decreased to 2 mV/h or less. It may be judged based on reduction of the voltage variation that the solvent and the unwanted substances have been removed from the PEFC stack 200, because it is assumed that the voltage is stabilized by removal of the solvent and the unwanted substances.

The power generation process is performed suitably within 300 hours after manufacturing the PEFC stack 200. Considering progress of degradation of the catalyst and/or progress of degradation of a joint state between the polymer electrolyte membrane 1 and the electrode catalyst layers 2 and 3, which is caused by the solvent and the unwanted substances, the power generation process is desirably performed as early as possible after manufacturing the PEFC stack 200. Specifically, progress of performance degradation of the PEFC stack 200 can be controlled if the power generation process is performed within 300 hours after manufactured.

The dew points of the oxidizing agent and the reducing agent in the power generation process are suitably within a range of −10° C. to +10° C. of the temperature of the MEA 10 in the power generation process. At such dew points, the water is sufficiently supplied to the MEA 10, and water clogging in the oxidizing agent passage 30 and the reducing agent passage 40, i.e., flooding, is controlled. As a result, the electrochemical reaction occurs uniformly in all of the MEAs 10. In other words, since the solvent and the unwanted substances can be discharged smoothly from all of the MEAs 10, degradation of performance of the PEFC stack 200 can be controlled more reliably.

Hereinbelow, specific examples of the step S0 of the third embodiment of the present invention will be described, and the step S0 is not intended to be limited to the examples below.

In the examples and comparisons below, hydrogen was used as the reducing agent and air was used as the oxidizing agent in the power generation process. The power generation process was carried out in such a manner that the air and the hydrogen temperature-increased and humidified were supplied to the oxidizing agent passage 30 and the reducing agent passage 40, respectively so that the reducing agent utilization ratio was 70% and the oxidizing agent utilization ratio was 40% while keeping the PEFC stack 200 at 70° C. After the power generation process, the PEFC stack 200 went through Step S1 and was preserved at a room temperature and an ordinary humidity for 8 weeks. The preservation period (8 weeks) is an example of a period of the present invention in which performance of the polymer electrolyte membrane 1 may degrade due to the solvent and the unwanted substances.

Example 3-1

After manufacturing the PEFC stack 200, the PEFC stack 200 was preserved at a room temperature and an ordinary humidity for 1 week. Hydrogen and air humidified to have a dew point of 70° C. were temperature-increased up to 70° C. and were supplied. The current density was I=0.4 A/cm$^2$ and the power generation continuation time period was T=3 h. After the power generation process, the PEFC stack 200 went through the step S1 and was preserved at a room temperature and an ordinary humidity for 8 weeks.

[Comparison 3-1]

The PEFC stack 200 manufactured in the same period as that of the example 3-1 continued to be preserved at a room temperature and an ordinary humidity. In other words, the PEFC stack 200 was preserved at the room temperature and the ordinary humidity during a time period that elapsed from when the PEFC stack 200 of the example 3-1 was manufactured until a preservation period ended after the power generation process.

[Comparison 3-2]

After manufacturing the PEFC stack 200, the PEFC stack 200 was preserved at a room temperature and an ordinary humidity for 1 week. Hydrogen and air humidified to have a dew point of 70° C. were temperature-increased up to 70° C. and were supplied, for 3 hours. After that, the PEFC stack 200 was preserved at a room temperature and an ordinary humidity for 8 weeks during which the power generation process was not carried out.

The PEFC stacks 200 of the example 3-1, the comparison 3-1, and the comparison 3-2 were caused to continue the rated power operation for 1000 hours under the condition in which the fuel gas utilization ratio was 70%, the oxidizing gas utilization ratio was 40%, and the current density was 0.2 A/cm$^2$ in such a manner that hydrogen and air humidified to have a dew point of 70° C. were temperature-increased up to 70° C.

and were supplied to the reducing agent passage 40 and the oxidizing agent passage 30, respectively while keeping the temperature of the PEFC stacks 200 at 70° C. Table 1 shows voltage drop amount ΔV of each of the example 3-1, the comparison 3-1, and the comparison 3-2 in the rated power operation.

TABLE 1

|  | Δ V (mV) |
|---|---|
| Example 3-1 | 10 |
| Comparison 3-1 | 100 |
| Comparison 3-2 | 90 |

The table 1 clearly shows that the voltage drop amount ΔV is smaller in the example 3-1 than in the comparison 3-1, and the comparison 3-2. From this result, it was confirmed that the power generation process allows degradation of performance of the PEFC stack 200 to be controlled more reliably.

Example 3-2

After manufacturing the PEFC stack 200, the PEFC stack 200 was preserved at a room temperature and an ordinary humidity for 1 week. The PEFC stack 200 was caused to carry out a power generation process in such a manner that hydrogen and air humidified to have a dew point of 70° C. were temperature-increased up to 70° C. and were supplied under the condition in which the current density was I=0.1 A/cm$^2$ and the power generation continuation time period was T=12 h. After the power generation process, the PEFC stack 200 went through the step S1 and was preserved at a room temperature and an ordinary humidity for 8 weeks.

[Comparison 3-3]

After manufacturing the PEFC stack 200, the PEFC stack 200 was preserved at a room temperature and an ordinary humidity for 1 week. The PEFC stack 200 was caused to carry out a power generation process under the condition in which a current density was I=0.5 A/cm$^2$ and a power generation continuation time period was T=12 h in such a manner that hydrogen and air humidified to have a dew point of 70° C. were temperature-increased up to 70° C. and were supplied. After the power generation process, the PEFC stack 200 went through the step S1 and was preserved at a room temperature and an ordinary humidity for 8 weeks.

[Comparison 3-4]

After manufacturing the PEFC stack 200, the PEFC stack 200 was preserved at a room temperature and an ordinary humidity for 1 week. The PEFC stack 200 was caused to carry out a power generation process under the condition in which the current density was I=0.5 A/cm$^2$ and the power generation continuation time period was T=3 h in such a manner that hydrogen and air humidified to have a dew point of 70° C. were temperature-increased up to 70° C. and were supplied. After the power generation process, the PEFC stack 200 went through the step S1 and was preserved at a room temperature and an ordinary humidity for 8 weeks.

[Comparison 3-5]

After manufacturing the PEFC stack 200, the PEFC stack 200 was preserved at a room temperature and an ordinary humidity for 1 week. The PEFC stack 200 was caused to carry out a power generation process under the condition in which the current density was I=0.4 A/cm$^2$ and the power generation continuation time period was T=2 h in such a manner that hydrogen and air humidified to have a dew point of 70° C. were temperature-increased up to 70° C. and were supplied. After the power generation process, the PEFC stack 200 went through the step S1 and was preserved at a room temperature and an ordinary humidity for 8 weeks.

As in the example 3-1, the PEFC stacks 200 of the example 3-2, the comparison 3-3, the comparison 7-4, and the comparison 7-5 were caused to continue the rated power operation for 1000 hours under the condition in which the fuel gas utilization ratio was 70%, the oxidizing gas utilization ratio was 40%, and the current density was 0.2 A/cm$^2$ in such a manner that hydrogen and air humidified to have a dew point of 70° C. were temperature-increased up to 70° C. and were supplied while keeping the PEFC stack 200 at 70° C.

Table 2 shows the current density I and the power generation continuation time period T in the power generation process, voltage variation (dV/dt) at the end of the power generation process, and the voltage drop amount ΔV in the rated power operation of each of the example 3-1, the example 3-2, the comparison 3-3, the comparison 3-4, and the comparison 3-5.

TABLE 2

|  | I (A/cm$^2$) | T (h) | dV/dt (mV/h) | Δ V (mV) |
|---|---|---|---|---|
| Example 3-1 | 0.4 | 3 | 1.5 | 10 |
| Example 3-2 | 0.1 | 12 | 0.0 | 8 |
| Comparison 3-3 | 0.05 | 12 | 5.0 | 50 |
| Comparison 3-4 | 0.5 | 3 | 3.0 | 70 |
| Comparison 3-5 | 0.4 | 2 | 4.5 | 60 |

As can be seen from comparison between the example 3-1 and the comparison 3-4, and comparison between the example 3-2 and the comparison 3-3, the voltage drop amounts ΔV are smaller in the example 3-1 and the example 3-2 than in the comparison 3-3 and the comparison 3-4. From this, the current density in the power generation process is suitably in a range of 0.1 A/cm$^2$ to 0.4 A/cm$^2$. This is because, it may be assumed that, with the current density in this range, water generation in the electrochemical reaction in the MEA 10 is uniform.

In the example 3-1 and the example 3-2, the voltage variations (dV/dt) at the end of the power generation process are decreased to 1.5 mV/h or less, in contrast to the comparison 3-3, the comparison 3-4, and the comparison 3-5. It may be assumed that the solvent and the unwanted substances have been sufficiently discharged from the interior of the PEFC stack 200 when the voltage variation (dV/dt) is decreased to approximately 1.5 mV/h or less, because the voltage variation (dV/dt) occurs when the solvent and the substances remaining inside the PEFC stack 200, especially in the bores inside the electrode catalyst layers 2 and 3 are discharged outside the PEFC stack 200 along with the water generated through the electrochemical reaction.

As can be clearly seen from comparison between the example 3-1 and the comparison 3-5, the voltage drop amount ΔV is smaller in the example 3-1 than in the comparison 3-5. Therefore, the power generation continuation time period T in the power generation process is suitably 3 hours or more, because at least 3 hours may be required to discharge the solvent and the unwanted substances from the PEFC stack 200.

Example 3-3

After manufacturing the PEFC stack 200, the PEFC stack 200 was preserved at a room temperature and an ordinary humidity for 300 hours, i.e., 2 weeks. In the example 3-3, the period W (week) before the power generation process is expressed as W=2. The PEFC stack 200 was caused to carry out a power generation process under the condition in which the current density was I=0.4 A/cm² and the power generation continuation time period was T=3 h in such a manner that hydrogen and air humidified to have a dew point of 70° C. were temperature-increased up to 70° C. and were supplied. After the power generation process, the PEFC stack 200 went through the step S1 and was preserved at a room temperature and an ordinary humidity for 8 weeks.

[Comparison 3-6]

After manufacturing the PEFC stack 200, the PEFC stack 200 was preserved at a room temperature and an ordinary humidity for 500 hours, i.e., about 3 weeks. In the comparison 3-6, the period W (week) before the power generation process is expressed as W=3. The PEFC stack 200 was caused to carry out a power generation process under the condition in which the current density was I=0.4 A/cm² and the power generation continuation time period was T=3 h in such a manner that hydrogen and air humidified to have a dew point of 70° C. were temperature-increased up to 70° C. and were supplied. After the power generation process, the PEFC stack 200 went through the step S1 and was preserved at a room temperature and at an ordinary humidity for 8 weeks.

As in the example 3-1, the PEFC stacks 200 of the example 3-3 and the comparison 3-6 were caused to continue the rated power operation for 1000 hours under the condition in which the fuel gas utilization ratio was 70%, the oxidizing gas utilization ratio was 40%, and the current density was 0.2 A/cm² in such a manner that hydrogen and air humidified to have a dew point of 70° C. were temperature-increased up to 70° C. and were supplied, while keeping the PEFC stack 200 at 70° C.

Table 3 shows the time period W before the power generation process, the current density I and the power generation continuation time period T in the power generation process, the voltage variation (dV/dt) at the end of the power generation process, and the voltage drop amount ΔV in the rated power operation of each of the example 3-1, the example 3-3, and the comparison 3-6. As described above, in the example 1, the PEFC stack 200 was preserved at a room temperature and an ordinary humidity for about 1 week, to be precise, 150 hours. The time period W (week) before the power generation process of the example 1 was expressed as W=1.

TABLE 3

| | W (week) | I (A/cm²) | T (h) | dV/dt (mV/h) | ΔV (mV) |
|---|---|---|---|---|---|
| Example 3-1 | 1 | 0.4 | 3 | 1.5 | 10 |
| Example 3-3 | 2 | 0.4 | 3 | 2.0 | 12 |
| Comparison 3-6 | 3 | 0.4 | 3 | 1.5 | 80 |

As can be seen from comparison between the example 3-1, the example 3-3, and the comparison 3-6, the voltage drop amount ΔV is smaller in the example 3-1 and the example 3-3 than in the comparison 3-6. Therefore, the time period W before the power generation process is suitably within W=2. In brief, the power generation process is suitably carried out within 300 hours after the PEFC stack 200 is manufactured.

Example 3-4

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation continuation time period was T=3 h in such a manner that hydrogen and air humidified to have a dew point 60° C. were temperature-increased up to 60° C. and were supplied, while keeping the PEFC stack 200 at 70° C. Here, temperature difference ΔS between the PEFC stack 200 which is the reference, and the oxidizing agent and the reducing agent in the power generation process was set to −10° C. After the power generation process, the PEFC stack 200 went through the step S1 and was preserved at a room temperature and an ordinary humidity for 8 weeks.

Example 3-5

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation continuation time period was T=3 h in such a manner that hydrogen and air humidified to have a dew point of 80° C. were temperature-increased up to 80° C. and were supplied, while keeping the PEFC stack 200 at 70° C. Here, temperature difference ΔS between the PEFC stack 200 which is the reference, and the oxidizing agent and the reducing agent in the power generation process was set to +10° C. After the power generation process, the PEFC stack 200 went through the step S1 and was preserved at a room temperature and an ordinary humidity for 8 weeks.

[Comparison 3-7]

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation continuation time period was T=3 h in such a manner that hydrogen and air humidified to have a dew point 50° C. were temperature-increased up to 50° C. and were supplied, while keeping the PEFC stack 200 at 70° C. Here, temperature difference ΔS between the PEFC stack 200 which is the reference, and the oxidizing agent and the reducing agent in the power generation process was set to −20° C. After the power generation process, the PEFC stack 200 went through the step S1 and was preserved at a room temperature and an ordinary humidity for 8 weeks.

[Comparison 3-8]

After manufacturing the PEFC stack 200, the PEFC stack 200 was preserved at a room temperature and an ordinary humidity for 1 week. The PEFC stack 200 was caused to carry out the power generation process under the condition in which the current density was I=0.4 A/cm² and the power generation continuation time period was T=3 h in such a manner that hydrogen and air humidified to have a dew point 85° C. were temperature-increased up to 85° C. and were supplied while keeping the PEFC stack 200 at 85° C. Here, temperature difference ΔS between the PEFC stack 200 which is the reference, and the oxidizing agent and the reducing agent in the power generation process was set to +15° C. After the power generation process, the PEFC stack 200 went through the step S1 and was preserved at a room temperature and an ordinary humidity for 8 weeks.

The PEFC stacks 200 of the example 3-4, the example 3-5, the comparison 3-7 and the comparison 3-8 were caused to continue the rated power operation for 1000 hours under the condition in which the fuel gas utilization ratio was 70%, the oxidizing gas utilization ratio was 40% and the current density was I=0.2 A/cm² in such a manner that hydrogen and air humidified to have a dew point of 70° C. were temperature-increased up to 70° C. and were supplied, while keeping the temperature of the PEFC stack 200 at 70° C. Table 4 shows the current density I, the power generation continuation time period T and the temperature difference ΔS in the power generation process, the voltage variation (dV/dt) at the end of the power generation process, and the voltage drop amount ΔV in the rated power operation of each of the example 3-4, the example 3-5, the comparison 3-7 and the comparison 3-8.

TABLE 4

|  | I (A/cm²) | T (h) | ΔS (° C.) | dV/dt (mV/h) | ΔV (mV) |
|---|---|---|---|---|---|
| Example 3-4 | 0.4 | 3 | −10 | 1.5 | 15 |
| Example 3-5 | 0.4 | 3 | +10 | 2.0 | 14 |
| Comparison 3-7 | 0.4 | 3 | −20 | 3.0 | 55 |
| Comparison 3-8 | 0.4 | 3 | +15 | 5.0 | 65 |

Table 4 clearly shows that the voltage drop amounts ΔV are smaller in the example 3-4 and the example 3-5 than in the comparison 3-7 and the comparison 3-8. Therefore, the temperature difference ΔS in the power generation process is suitable in a range of −10° C. to +10° C. This is because, it may be assumed that, when the temperature difference ΔS is outside the range of −10° C. to +10° C., a non-uniform electrochemical reaction occurs in the MEA 10 because of water deficiency in the MEA 10, causing the solvent and the unwanted substances to be insufficiently discharged from the interior of the PEFC stack 200, in particular from the interior of the pores within the electrode catalyst layers 2 and 3.

As can be seen from the table 4, the voltage variations (dV/dt) in the example 3-4 and the example 3-5 are 2.0 mV/h or less and the voltage variations (dV/dt) in the comparison 3-7 and the comparison 3-8 are above 2.0 mV/h. From this result and the result of the table 2, it may be assumed that, when the voltage variation (dV/dt) is decreased to approximately 2.0 mV or less, the solvent and the unwanted substances have been sufficiently discharged from the interior of the PEFC stack 200. It is therefore desirable to continue the power generation process until the voltage variation (dV/dt) is decreased to 2.0 mV or less.

Thus far, in the first to third embodiments, the preservation method of the PEFC stack 200 and the preservation assembly of the PEFC stack of the present invention have been described.

As should be appreciated from the above, in the preservation method of the PEFC stack and the preservation assembly of the PEFC stack of the present invention, since the interior of the oxidizing agent passage 30 and the interior of the reducing agent passage 40 of the PEFC stack in the uninstalled state are preserved in the pressure-reduced state, the solvent remaining in the oxidizing agent electrode catalyst layer and the reducing agent electrode catalyst layer are volatilized under the pressure-reduced states. By way of example, in the preservation method of the PEFC stack 200 of the first and second embodiments, in step S1, volatilization of the solvent remaining in the oxidizing agent side electrode catalyst layer 2 and the reducing agent side electrode catalyst layer 3 are promoted, and the volatilized solvent is discharged outside the PEFC stack 200. And, in step (maintaining step) S2, the volatilized state of the solvent is maintained. This makes it possible to sufficiently control degradation of performance of the polymer electrolyte fuel cell stack during a time period that elapses from when the stack is placed in an uninstalled state until it is placed in an installation position and is practically used. In addition, under the pressure-reduced state, oxygen concentration in the interior of the oxidizing agent passage and in the reducing agent passage can be easily kept less than oxygen concentration in atmosphere, and the partial oxidization reaction and dehydration and condensation reaction of the organic solvent component remaining in the electrode catalyst layer (including a reaction between organic solvent components, a reaction between partial oxidization products, and a reaction between the organic solvent component and the partial oxidation product) can be sufficiently inhibited. According to this respect, in particular, it is possible to sufficiently control degradation of performance of the polymer electrolyte fuel cell stack during a time period that elapses from when the stack is placed in an uninstalled state until it is placed in an installation position and is practically used.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention. For example, in the first and second embodiments, the step (volatilizing and removing step) S1 may be omitted. That is, the preservation assemblies 300 and 310 of the PEFC stack can be manufactured under the pressure-reduced state, by, for example, manufacturing it in the interior of the vacuum chamber.

INDUSTRIAL APPLICABILITY

The present invention is useful as a method of preserving a polymer electrolyte fuel cell stack, which is capable of controlling degradation of performance of the polymer electrolyte fuel cell stack during a time period that elapses from when the stack is placed in an uninstalled state until it is placed in an installation position and is practically used. Also, the present invention is useful as a preservation assembly of the polymer electrolyte fuel cell stack which is capable of sufficiently inhibiting degradation of performance of the polymer electrolyte fuel cell stack during a time period that elapses from when the stack is placed in the uninstalled state until it is placed in the installation position and is practically used.

The invention claimed is:

1. A method of preserving a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage, the method comprising:

preserving the polymer electrolyte fuel cell stack in an uninstalled state in such a manner that an interior of the oxidizing agent passage and an interior of the reducing agent passage are set in a pressure-reduced state, wherein:

the uninstalled state is a state that the polymer electrolyte fuel cell stack is not incorporated into a fuel system for generating power;

before the step of preserving, the polymer electrolyte fuel cell stack is placed into a sealing container provided with an exhaust outlet and an opening, the opening is then closed, and an exhaust device is connected to the exhaust outlet to reduce a pressure of an interior of the sealing container by exhausting air from the interior of the sealing container;

in the step of preserving, the exhaust device is attached in a sealed state to the exhaust outlet, or a sealing valve disposed to open and close the exhaust outlet is closed; and the sealing container is made of a resin.

2. A method of preserving a polymer electrolyte fuel cell stack that is provided with an oxidizing agent passage having an inlet and an outlet and extending through a cathode and a reducing agent passage having an inlet and an outlet and extending through an anode, the polymer electrolyte fuel cell stack being configured to generate power through an electrochemical reaction caused to occur in the cathode and the anode using an oxidizing agent supplied from the inlet of the oxidizing agent passage and a reducing agent supplied from the inlet of the reducing agent passage, the method comprising:

preserving the polymer electrolyte fuel cell stack in an uninstalled state in such a manner that an interior of the oxidizing agent passage and an interior of the reducing agent passage are set in a pressure-reduced state, wherein:

the uninstalled state is a state that the polymer electrolyte fuel cell stack is not incorporated into a fuel cell system for generating power, in the step of preserving, the polymer electrolyte fuel cell stack is placed in a sealed container, an inside of the sealed container is set in a pressure-reduced state, and the sealed container is made of a resin.

* * * * *